(12) United States Patent
Meyerhofer et al.

(10) Patent No.: US 9,082,141 B2
(45) Date of Patent: Jul. 14, 2015

(54) SYSTEMS AND METHODS TO IMPLEMENT DEMAND RESPONSE EVENTS

(75) Inventors: Mark Joseph Meyerhofer, Acworth, GA (US); James Joseph Schmid, Acworth, GA (US); Jerry Steven Massey, Lawrenceville, GA (US); Jaime Alberto Sierra, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 927 days.

(21) Appl. No.: 13/283,390

(22) Filed: Oct. 27, 2011

(65) Prior Publication Data

US 2013/0110305 A1    May 2, 2013

(51) Int. Cl.
*G05D 17/00* (2006.01)
*G06Q 30/06* (2012.01)
*G06Q 50/06* (2012.01)

(52) U.S. Cl.
CPC ............... *G06Q 30/06* (2013.01); *G06Q 50/06* (2013.01)

(58) Field of Classification Search
CPC . H02J 3/14; H02J 2003/146; H02J 2003/143; Y02B 70/3225; Y02B 70/3266; Y02B 90/245; Y04S 20/222; Y04S 20/242; Y04S 10/126; Y04S 20/224; Y04S 30/12; G06F 1/26; G06F 1/3203; G06F 1/3234
See application file for complete search history.

(56) References Cited

U.S. PATENT DOCUMENTS

| | | | |
|---|---|---|---|
| 3,678,284 A | 7/1972 | Peters | |
| 3,872,286 A | 3/1975 | Putman | |
| 3,906,242 A | 9/1975 | Stevenson | |
| 3,925,680 A | 12/1975 | Dixon | |
| 3,995,686 A | 12/1976 | Laube | |
| 4,031,406 A | 6/1977 | Leyde et al. | |
| 4,059,747 A | 11/1977 | Brody | |
| 4,100,426 A | 7/1978 | Baranowski et al. | |
| 4,117,537 A | 9/1978 | Muench | |
| 4,125,782 A | 11/1978 | Pollnow, Jr. | |
| 4,197,468 A | 4/1980 | Reid, Jr. | |
| 4,310,770 A | 1/1982 | Keener et al. | |
| 4,804,938 A | 2/1989 | Rouse et al. | |
| 4,847,781 A | 7/1989 | Brown, III et al. | |
| 5,381,462 A | 1/1995 | Larson et al. | |
| 5,687,139 A | 11/1997 | Budney | |
| 6,018,690 A | 1/2000 | Saito et al. | |
| 6,064,420 A | 5/2000 | Harrison et al. | |
| 6,078,785 A | 6/2000 | Bush | |

(Continued)

OTHER PUBLICATIONS

Tsikalakis et al., "Centralized Control for Optimizing Microgrids Operation", IEEE, Jul. 24-29, 2011, pp. 1-8.

(Continued)

*Primary Examiner* — Sean Shechtman
(74) *Attorney, Agent, or Firm* — Armstrong Teasdale LLP

(57) ABSTRACT

A computing device for use with a demand response system is provided. The computing device includes a communication interface for receiving customer data of a plurality of customers, wherein the customer data includes at least a location, a policy limitation, a participation history, and an enrollment status for each customer. A processor is coupled to the communication interface and programmed to select at least one participant from the plurality of customers, based on the customer data, to participate in at least one demand response event. The processor is further programmed to verify that the selected participant, based on the customer data, satisfies at least one precondition to receive at least one signal representative of the demand response event.

17 Claims, 3 Drawing Sheets

(56) References Cited

U.S. PATENT DOCUMENTS

| | | | |
|---|---|---|---|
| 6,098,050 | A | 8/2000 | Knoblock et al. |
| 6,138,461 | A | 10/2000 | Park et al. |
| 6,528,957 | B1 | 3/2003 | Luchaco |
| 6,697,951 | B1 | 2/2004 | Sinha et al. |
| 6,900,738 | B2 | 5/2005 | Crichlow |
| 6,909,942 | B2 | 6/2005 | Andarawis et al. |
| 7,019,496 | B1 | 3/2006 | Garretson |
| 7,039,532 | B2 | 5/2006 | Hunter |
| 7,123,994 | B2 | 10/2006 | Weik et al. |
| 7,181,320 | B2 | 2/2007 | Whiffen et al. |
| 7,206,670 | B2 | 4/2007 | Pimputkar et al. |
| 7,274,305 | B1 | 9/2007 | Luttrell |
| 7,310,620 | B2 | 12/2007 | Moore et al. |
| 7,333,982 | B2 | 2/2008 | Bakalash et al. |
| 7,373,221 | B2 | 5/2008 | Lal |
| 7,373,222 | B1 | 5/2008 | Wright et al. |
| 7,392,115 | B2 | 6/2008 | Schindler |
| 7,561,681 | B2 | 7/2009 | Booth et al. |
| 7,565,227 | B2 | 7/2009 | Richard et al. |
| 7,653,443 | B2 | 1/2010 | Flohr |
| 7,660,649 | B1 | 2/2010 | Hope et al. |
| 7,715,951 | B2 | 5/2010 | Forbes, Jr. et al. |
| 7,743,001 | B1 | 6/2010 | Vermeulen et al. |
| 7,778,738 | B2 | 8/2010 | Taft |
| 7,885,917 | B2 | 2/2011 | Kuhns et al. |
| 7,945,466 | B2 | 5/2011 | Klett et al. |
| 7,962,248 | B2 | 6/2011 | Flohr |
| 8,219,258 | B1 | 7/2012 | Almeida et al. |
| 2001/0010032 | A1 | 7/2001 | Ehlers et al. |
| 2001/0014976 | A1 | 8/2001 | Roop et al. |
| 2001/0034236 | A1 | 10/2001 | Tong et al. |
| 2002/0072868 | A1 | 6/2002 | Bartone et al. |
| 2003/0125843 | A1 | 7/2003 | Prasad |
| 2003/0167178 | A1 | 9/2003 | Jarman et al. |
| 2004/0075343 | A1 | 4/2004 | Wareham et al. |
| 2004/0088083 | A1 | 5/2004 | Davis et al. |
| 2004/0107259 | A1 | 6/2004 | Wallace et al. |
| 2005/0165511 | A1 | 7/2005 | Fairlie |
| 2005/0240668 | A1 | 10/2005 | Rolia et al. |
| 2006/0143483 | A1 | 6/2006 | Liebenow |
| 2007/0177319 | A1 | 8/2007 | Hirst |
| 2007/0260359 | A1 | 11/2007 | Benson et al. |
| 2008/0167756 | A1 | 7/2008 | Golden et al. |
| 2008/0177678 | A1 | 7/2008 | Di Martini et al. |
| 2009/0018706 | A1 | 1/2009 | Wittner |
| 2009/0187499 | A1 | 7/2009 | Mulder et al. |
| 2009/0194601 | A1 | 8/2009 | Flohr |
| 2009/0240964 | A1 | 9/2009 | Pfeiffer |
| 2009/0256686 | A1 | 10/2009 | Abbot et al. |
| 2009/0295594 | A1 | 12/2009 | Yoon |
| 2009/0326726 | A1 | 12/2009 | Ippolito et al. |
| 2010/0017045 | A1 | 1/2010 | Nesler et al. |
| 2010/0088261 | A1 | 4/2010 | Montalvo |
| 2010/0107173 | A1 | 4/2010 | Chassin |
| 2010/0138065 | A1 | 6/2010 | Taft |
| 2010/0145540 | A1 | 6/2010 | Mckenna |
| 2010/0179704 | A1 | 7/2010 | Ozog |
| 2010/0179862 | A1 | 7/2010 | Chassin et al. |
| 2010/0217550 | A1 | 8/2010 | Crabtree et al. |
| 2010/0286937 | A1 | 11/2010 | Hedley et al. |
| 2010/0332373 | A1 | 12/2010 | Crabtree et al. |
| 2011/0125542 | A1 | 5/2011 | Koch |
| 2011/0196546 | A1 | 8/2011 | Muller et al. |
| 2011/0202217 | A1 | 8/2011 | Kempton |
| 2011/0258018 | A1 | 10/2011 | Tyagi et al. |
| 2012/0004786 | A1 | 1/2012 | Lo et al. |
| 2012/0022709 | A1 | 1/2012 | Taylor |
| 2012/0116600 | A1 | 5/2012 | Schmid et al. |
| 2012/0130556 | A1 | 5/2012 | Marhoefer |
| 2012/0136496 | A1 | 5/2012 | Black et al. |
| 2012/0310860 | A1 | 12/2012 | Kim et al. |
| 2012/0323393 | A1 | 12/2012 | Imhof et al. |
| 2013/0035883 | A1 | 2/2013 | San Andreas et al. |
| 2013/0254151 | A1 | 9/2013 | Mohagheghi et al. |
| 2014/0062195 | A1* | 3/2014 | Bruschi et al. ................ 307/38 |

OTHER PUBLICATIONS

Kok et al., "PowerMatcher: Multiagent Control in the Electricity Infrastructure", AAMAS, 2005, pp. 75-82.

Ilic, M.D., "From Hierarchical to Open Access Electric Power System", IEEE, 2007, pp. 1060-1084.

* cited by examiner

SYSTEMS AND METHODS TO IMPLEMENT DEMAND RESPONSE EVENTS

BACKGROUND OF THE INVENTION

The field of the invention relates generally to demand response systems and, more particularly, to a computing device for use with a demand response system that enables a utility to implement demand response events.

As the human population increases around the world and with an increase in the use of electric vehicles by customers, energy demand will also likely increase. More specifically, energy demand will likely increase in the form of electrical energy used to power buildings, homes, and/or to charge batteries or other energy sources used in electric vehicles. Moreover, the demand on the power grid is likely to increase while the demand for fuel decreases. Such demands will likely cause an increase in the price of energy from the power grid. In particular, the price of energy is likely to increase during peak times, such as a time of day and/or a day of the week, when demand for energy is high.

Currently, at least some known utilities use demand response systems that enable customers to enroll in at least one demand response program to manage the consumption of energy by their customers in response to supply conditions. Examples of demand response programs include a direct control program, a peak pricing program, such as a critical peak pricing program, and a time of use program. The initiation and/or implementation of a demand response program by a utility is known as a demand response event. A demand response event is initiated by a utility transmitting a plurality of signals to its customers. For example, a demand response event representative of a direct load control program, is initiated when the utility transmits a signal to a device within a building, such as an in-home smart device and/or smart thermostat, such that the utility is enabled to directly control the usage of energy consuming machines within the building. A demand response event representative of a critical peak pricing program occurs when the utility transmits pricing signals to its customers during peak demand times. The pricing signals enable the utility to apprise customers of heightened energy prices during peak demand time periods such that customers may limit their energy consumption during such peak demand time periods. A demand response event representative of a time of use program occurs when the utility transmits a signal to a customer that is representative of energy prices that correspond to a time range such that the customer may identify an optimal time of day and/or day of the week to consume energy to ensure a low energy price rate.

Such demand response systems enable the utility to manage peak load conditions and to reduce energy demand and/or consumption among its customers. More specifically, utilities manage peak load conditions by scheduling a fixed number of demand response events per day, week, and/or month for their customers. However, current demand response systems are unable to target specific customers for participating in a scheduled demand response event and, as a result, all the customers may receive signals from the utility that are representative of a demand response event. For example, current demand response systems are unable to select and/or identify customers based on various factors, such as an enrollment status in various demand response programs and/or a geographic location for each customer. As a result, some of the customers may be unnecessarily burdened with receiving the signal, as they may not have agreed to participate in the scheduled event and/or they may not reside in an appropriate location for participating in the scheduled event. Even if specific customers may be selected to receive the signals from the utility, current demand response systems are unable to validate or verify whether such customers are appropriate for receiving the signals. For example, some of the selected customers may have a policy limitation in their agreements with the utility in which each customer may only receive a signal once a day that is representative of a demand response event. As such, if the utility transmits more than one signal to such customers, the utility would be in violation of the agreements. Without validating or verifying the customers, the utility also cannot take into account any changes in a participation history for each customer for participating in demand response events, changes in an enrollment status, and/or changes in a policy limitation.

BRIEF DESCRIPTION OF THE INVENTION

In one embodiment, a computing device for use with a demand response system is provided. The computing device includes a communication interface for receiving customer data of a plurality of customers, wherein the customer data includes at least a location, a policy limitation, a participation history, and an enrollment status for each customer. A processor is coupled to the communication interface and programmed to select at least one participant from the plurality of customers, based on the customer data, to participate in at least one demand response event. The processor is further programmed to verify that the selected participant, based on the customer data, satisfies at least one precondition to receive at least one signal representative of the demand response event.

In another embodiment, a demand response system is provided. The demand response system includes a data management system that includes a database that includes customer data of a plurality of customers. The customer data includes at least a location, a policy limitation, a participation history, and an enrollment status for each customer. A computing device is coupled to the data management system. The computing device includes a communication interface for receiving the customer data. A processor is coupled to the communication interface and programmed to select at least one participant from the plurality of customers, based on the customer data, to participate in at least one demand response event. The processor is further programmed to verify that the selected participant, based on the customer data, satisfies at least one precondition to receive at least one signal representative of the demand response event.

In yet another embodiment, a method for determining participants for participating in demand response events is provided. Customer data of a plurality of customers is received, wherein the customer data includes at least a location, a policy limitation, a participation history, and an enrollment status for each customer. At least one participant of the plurality of customers is selected, based on the customer data, to participate in at least one demand response event. The method includes verifying, based on the customer data, that the selected participant has satisfied at least one precondition to receive at least one signal representative of the demand response event.

DETAILED DESCRIPTION OF THE INVENTION

The exemplary systems and methods described herein overcome at least some known disadvantages of known demand response systems by enabling a utility to determine participants for demand response events. The embodiments described herein include a demand response system that includes a computing device, wherein the computing device includes a communication interface for receiving customer data of a plurality of customers, wherein the customer data includes at least a location, a policy limitation, a participation history, and an enrollment status for each customer. A processor is coupled to the communication interface and programmed to select at least one participant from the plurality of customers, based on the customer data, to participate in at least one demand response event. The processor is further programmed to verify that the selected participant, based on the customer data, satisfies at least one precondition to receive at least one signal representative of the demand response event. By selecting participants of the customers for participating in a demand response event and by verifying whether each participant is appropriate for receiving a signal representative of the demand response event, the burden on every customer may be substantially reduced. By verifying each of the participants, the utility is also enabled to prevent any violations of any agreements and/or policy limitations they have with their customers.

Figure 1:
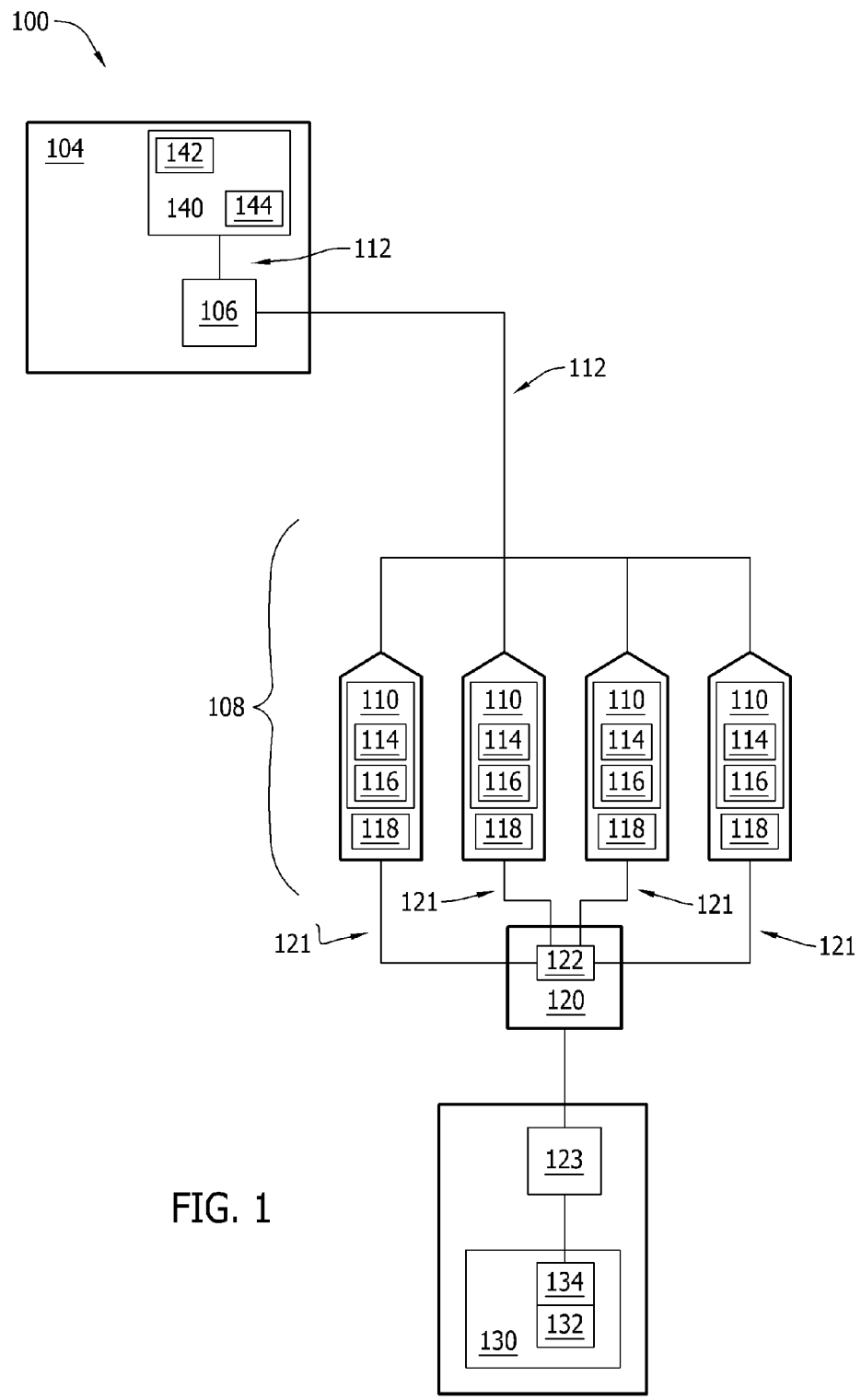
FIG. 1 is a block diagram of an exemplary demand response system.

FIG. 1 illustrates a demand response system 100. In the exemplary embodiment, demand response system 100 includes a utility 104 and a computing device 106 positioned within utility 104, wherein computing device 106 enables utility 104 to communicate with customers. Alternatively, computing device 106 may be positioned at another location with respect to utility 104. Moreover, in the exemplary embodiment, computing device 106 is communicatively coupled to a plurality of buildings 108, wherein a plurality of customers may reside. It should be noted that, as used herein, the term "couple" is not limited to a direct mechanical, electrical, and/or communication connection between components, but may also include an indirect mechanical, electrical, and/or communication connection between multiple components.

More specifically, in the exemplary embodiment, computing device 106 is communicatively coupled to at least one user notification device 110 within each building 108 via a network 112 such that computing device 106 may communicate with user notification device 110. In the exemplary embodiment, user notification device 110 may be a computer, a cellular phone, and/or a smart device, including a smart box and/or smart thermostat. Alternatively, user notification device 110 may be any other device that is configured to communicate with computing device 106. In the exemplary embodiment, each user notification device 110 is connected to network 112 and thus, each customer of utility 104 who is the owner and/or user of user notification device 110, has the same network location. Alternatively, each user notification device 110 may be connected to different networks.

Each user notification device 110 includes a user interface 114 that receives at least one input from a user, such as a customer of utility 104. In the exemplary embodiment, user interface 114 may include, for example, a keyboard, a pointing device, a mouse, a stylus, a touch sensitive panel (e.g., a touch pad or a touch screen), a gyroscope, an accelerometer, a position detector, and/or an audio input interface (e.g., including a microphone) that enables the user to input pertinent information.

Moreover, in the exemplary embodiment, each user notification device 110 includes a presentation interface 116 that presents information, such as information regarding demand response programs and/or demand response events that are received from utility 104, input events and/or validation results, to the user. In the exemplary embodiment, presentation interface 116 includes a display adapter (not shown) that is coupled to at least one display device (not shown). More specifically, in the exemplary embodiment, the display device is a visual display device, such as a cathode ray tube (CRT), a liquid crystal display (LCD), an organic LED (OLED) display, and/or an "electronic ink" display. Alternatively, presentation interface 116 may include an audio output device (e.g., an audio adapter and/or a speaker) and/or a printer.

In the exemplary embodiment, computing device 106 may communicate with each user notification device 110 using a wired network connection (e.g., Ethernet or an optical fiber), a wireless communication means, such as radio frequency (RF), e.g., FM radio and/or digital audio broadcasting, an Institute of Electrical and Electronics Engineers (IEEE®) 802.11 standard (e.g., 802.11(g) or 802.11(n)), the Worldwide Interoperability for Microwave Access (WIMAX®) standard, a cellular phone technology (e.g., the Global Standard for Mobile communication (GSM)), a satellite communication link, and/or any other suitable communication means. WIMAX is a registered trademark of WiMax Forum, of Beaverton, Oregon. IEEE is a registered trademark of the Institute of Electrical and Electronics Engineers, Inc., of New York, N.Y.

In the exemplary embodiment, user notification device 110 is configured to receive at least one signal from computing device 106 that may be representative of, for example, information related to at least one demand response program that a customer is enrolled in and/or that may be representative of a demand response event initiating and/or implementing the demand response program that the customer is enrolled in. In the exemplary embodiment, the demand response programs may include a direct load control program, a peak pricing program, such as a critical peak pricing program, and/or a time of use program.

In the exemplary embodiment, each building 108 also includes at least one machine 118. Each machine 118, in the exemplary embodiment, consumes energy, such as an appliance and/or a computer. User notification device 110 may or may not be coupled to machine 118. For example, if user notification device 110 is a smart device, then user notification device 110 may be coupled to machine 118, such as an appliance. Moreover, in the exemplary embodiment, each building 108 is coupled to a power distribution substation 120 via a plurality of conduits 121. In the exemplary embodiment, conduits 121 are fabricated from a metallic wire. Alternatively, conduits 121 may be fabricated from any other substance or compound that enables the distribution of electrical energy to each building 108.

More specifically, in the exemplary embodiment, substation 120 includes a grid 122 that is coupled to each building 108 and provides power to each building 108. In the exemplary embodiment, grid 122 is coupled to a generator 123 within a power generation system 124 that is operated by utility 104. In the exemplary embodiment, power generation system 124 includes a machine 130. Machine 130, in the exemplary embodiment, is a variable speed machine, such as a wind turbine, a hydroelectric steam turbine, a gas turbine, and/or any other machine that operates with a variable speed.

Alternatively, machine 130 may be a synchronous speed machine. In the exemplary embodiment, machine 130 includes a rotating device 132, such as a rotor or other device. Moreover, in the exemplary embodiment, rotating device 132 rotates a drive shaft 134 that is coupled to generator 123.

In the exemplary embodiment, utility 104 also includes a data management system 140 that is coupled to computing device 106 via network 112. Alternatively, data management system 140 may be separate from utility 104. Data management system 140 may be any device capable of accessing network 112 including, without limitation, a desktop computer, a laptop computer, or other web-based connectable equipment. More specifically, in the exemplary embodiment, data management system 140 includes a database 142 that includes customer data for each of the customers of utility 104. In the exemplary embodiment, database 142 can be fully or partially implemented in a cloud computing environment such that data from the database is received from one or more computers (not shown) within utility 104 or remote from utility 104. The customer data may include a location for each customer, such as a geographic location for each customer. The location may include a location on network 112 for each customer, and/or a location for a substation, such as substation 120, for each customer. The customer data may also include an enrollment status for each customer for participating in at least one demand response program. For example, the data may include a selection made by each customer for at least one demand response program to participate in. The customer data may also include at least one demand response program selected by each customer for each machine 118 to participate in. The customer data may include a participation history for each customer as well. The participation history may include, for example, the previous demand response events that each customer has participated in and the actual reduction in energy consumption that resulted from the participation in each of the events. In the exemplary embodiment, the customer data may also include a policy limitation that each customer may have included in any agreement with utility 104 regarding their participation in a demand response program and/or a demand response event. For example, in a policy limitation, a customer may have agreed to participate in only one demand response event per day. Customers, for example, may have also agreed to participate in a maximum number or a minimum number of total demand response programs and/or demand response events. As such, if the utility transmits more signals to such customers than was agreed to, the utility would be in violation of the policy limitation and/or agreement.

In the exemplary embodiment, data management system 140 includes a user interface 144 that receives at least one input from a user, such as an operator and/or employee of utility 104. In the exemplary embodiment, data management system user interface 144 may include, for example, a keyboard, a pointing device, a mouse, a stylus, a touch sensitive panel (e.g., a touch pad or a touch screen), a gyroscope, an accelerometer, a position detector, and/or an audio input interface (e.g., including a microphone) that enables the user to input pertinent information.

Data management system 140 may communicate with computing device 106 using a wired network connection (e.g., Ethernet or an optical fiber), a wireless communication means, such as radio frequency (RF), e.g., FM radio and/or digital audio broadcasting, an Institute of Electrical and Electronics Engineers (IEEE®) 802.11 standard (e.g., 802.11(g) or 802.11(n)), the Worldwide Interoperability for Microwave Access (WIMAX®) standard, a cellular phone technology (e.g., the Global Standard for Mobile communication (GSM)), a satellite communication link, and/or any other suitable communication means. More specifically, in the exemplary embodiment, data management system 140 transmits the customer data to computing device 106. While the customer data is shown as being stored in database 142 within data management system 140 in the exemplary embodiment, it should be noted that the customer data may be stored in another system and/or device. For example, computing device 106 may store the customer data therein.

During operation, utility 104 may transmit, for example, a questionnaire to its customers via computing device 106. The questionnaire provides questions to each customer to answer regarding the customer and the questionnaire provides various demand response programs that each customer may elect to participate in. More specifically, in the exemplary embodiment, the questionnaire is transmitted to user notification device 110. Each customer may input various responses to the questionnaire via user interface 114 within user notification device 110, including selecting at least one demand response program to participate in and/or selecting at least one demand response program for machine 118 to participate in. Alternatively, utility 104 may provide such a questionnaire to its customers via other means. For example, utility 104 may send the questionnaire via mail. Moreover, customers may provide responses for the questionnaire to utility 104 via other means, as opposed to via user notification device 110.

In the exemplary embodiment, if a customer provides his or her responses via user notification device 110, then the information that the customer provides is transmitted to computing device 106 via network 112. Computing device 106 then transmits the information to data management system 140, wherein the data is stored in database 142. If a customer provides his or her responses via other means, utility 104 may receive the information and a user, such as an employee of utility 104, may input the data to data management system 140 via data management system user interface 144, wherein the data may be stored in database 142.

When utility 104 needs to initiate and/or implement a demand response program, the user may manually input the initiation and/or implementation of a demand response event that corresponds to a demand response program to computing device 106 at a particular time. The user may also manually input the names of the customers such that computing device 106 may transmit at least one signal representative of at least one demand response event to the customers that are identified by the user.

Alternatively, computing device 106 may be programmed to select at least one participant from a plurality of customers of utility 104 to participate in at least one demand response event that results in reduction of energy consumption. More specifically, as explained in more detail below, computing device 106 receives the customer data from database 142 and selects the participants based on the customer data received. When the participants have been selected, computing device 106 will then verify, based on the customer data, that each of the selected participants satisfy at least one precondition to receive at least one signal representative of the demand response event.

Computing device 106 will then schedule the demand response event for the selected participants. More specifically, in the exemplary embodiment, computing device 106 schedules a start time and/or a duration of time for the demand response event to occur on a particular day of the week. When the demand response event has been scheduled, computing device 106 will then transmit at least one signal to each selected participant that is representative of the scheduled demand response event at the scheduled time. The signals may be transmitted to user notification device 110 such that each participant may receive the signal via presentation interface 116. Each participant may then choose whether to participate in the demand response event via user interface 114. By selectively targeting the participants for participating in a demand response event that is to be scheduled, the burden on every customer may be substantially reduced. By verifying each of the participants, utility 104 is also enabled to prevent any violations of any agreements and/or policy limitations they have with their customers.

In the exemplary embodiment, the customer data is frequently updated. For example, each time a participant participates in the demand response event, at least one signal representative of the participation and the actual reduction in energy consumption that resulted from the participation is transmitted to data management system 140 such that the participation history for each customer may be updated in database 142. Alternatively, the participation history for each customer may be updated in database 142 by a user via user interface 144. Similarly, changes in a customer's location, enrollment status, and/or policy limitation are also updated. Such information may be changed via user notification device 110 and/or provided to utility 104 via other means and manually updated in database 142 by a user via user interface 144.

Figure 2:
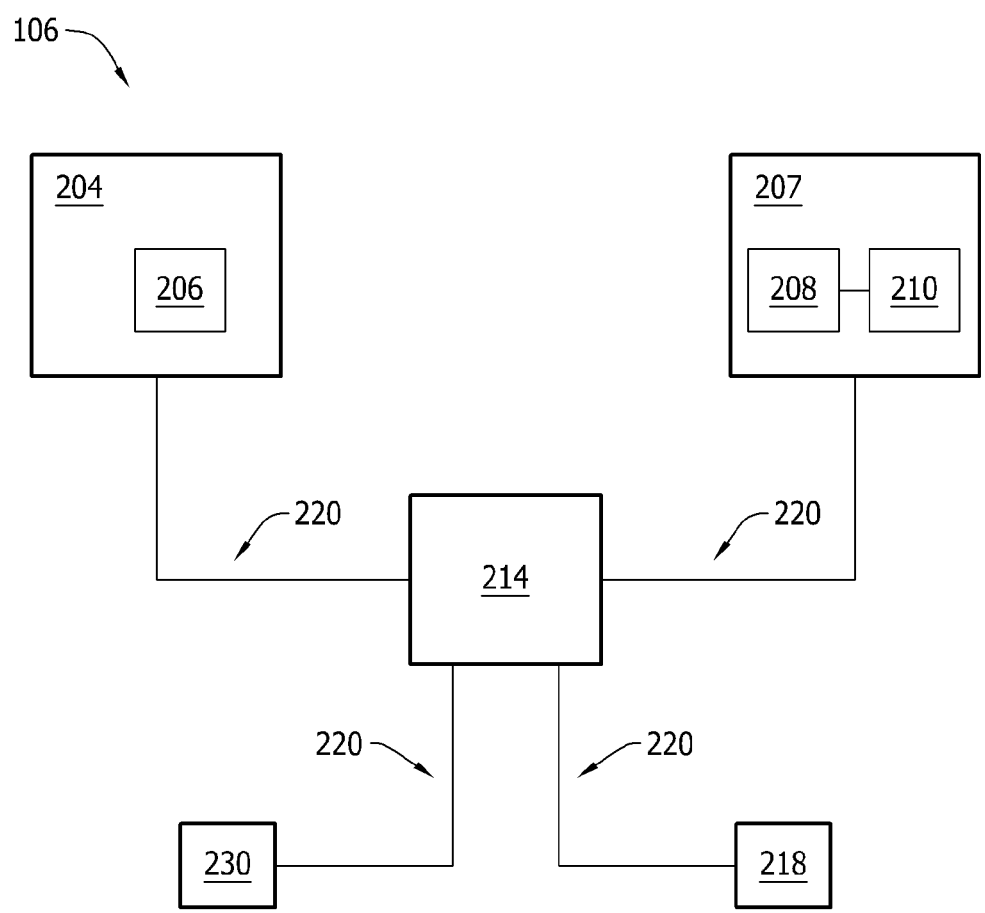
FIG. 2 is a block diagram of an exemplary computing device that may be used with the demand response system shown in FIG. 1.

FIG. 2 is a block diagram of computing device 106. In the exemplary embodiment, computing device 106 includes a user interface 204 that receives at least one input from a user, such as an operator and/or employee of utility 104 (shown in FIG. 1). In the exemplary embodiment, user interface 204 includes a keyboard 206 that enables the user to input pertinent information. Alternatively, user interface 204 may include, for example, a pointing device, a mouse, a stylus, a touch sensitive panel (e.g., a touch pad or a touch screen), a gyroscope, an accelerometer, a position detector, and/or an audio input interface (e.g., including a microphone).

Moreover, in the exemplary embodiment, computing device 106 includes a presentation interface 207 that presents information, such as input events and/or validation results, to the user. In the exemplary embodiment, presentation interface 207 includes a display adapter 208 that is coupled to at least one display device 210. More specifically, in the exemplary embodiment, display device 210 is a visual display device, such as a cathode ray tube (CRT), a liquid crystal display (LCD), an organic LED (OLED) display, and/or an "electronic ink" display. Alternatively, presentation interface 207 may include an audio output device (e.g., an audio adapter and/or a speaker) and/or a printer.

Computing device 106 also includes a processor 214 and a memory device 218. In the exemplary embodiment, processor 214 is coupled to user interface 204, presentation interface 207, and to memory device 218 via a system bus 220. In the exemplary embodiment, processor 214 communicates with the user, such as by prompting the user via presentation interface 207 and/or by receiving user inputs via user interface 204.

Moreover, in the exemplary embodiment, processor 214 is programmed by encoding an operation using one or more executable instructions and providing the executable instructions in memory device 218. In the exemplary embodiment, processor 214 is programmed to select at least one participant from the customers of utility 104 to participate in least one demand response event that results in a reduction of energy consumption. More specifically, in the exemplary embodiment, processor 214 is programmed to select the participants based on the customer data. For example, processor 214 may be programmed to select the participants by considering the location of each of the customers, such as a geographic location for each customer, a location on network 112 (shown in FIG. 1) for each customer, and/or a location for a substation, such as substation 120 (shown in FIG. 1), for each customer. Processor 214 may also be programmed to consider the enrollment status for each customer for participating in at least one demand response program. For example, processor 214 may consider the selection made by each customer for at least one demand response program to participate in. Processor 214 may also consider at least one demand response program selected by each customer for each machine 118 (shown in FIG. 1) to participate in. Processor 214 may also consider the participation history for each customer, such as the previous demand response events each customer has participated in. Processor 214 may also be programmed to select the participants by considering unwanted criteria. Alternatively, processor 214 may select the participants by considering any other information about each customer that enables computing device 106 and/or demand response system 100 (shown in FIG. 1) to function as described herein.

In the exemplary embodiment, processor 214 is also programmed to verify that the selected participants satisfy at least one precondition to receive at least one signal representative of the demand response event. Processor may be programmed with the various preconditions for the selected participants. For example, processor 214 may consider any policy limitations that the selected participants may have in any agreements with utility 104. Processor 214 may also consider the participation history of each of the selected participants, such as participating in similar demand response events in the past. Processor 214 may also consider the enrollment status for each of the selected participants for participating in at least one demand response program, such as a selection made by each participant for at least one demand response program to participate in and/or at least one demand response program selected by each participant for each machine 118 to participate in.

Processor 214, in the exemplary embodiment, is also programmed to schedule the demand response event when the selected participants have been verified. More specifically, processor 214 is programmed to schedule a start time for the demand response event to commence on a particular day of the week and/or processor is programmed to schedule a duration of time for the demand response event to take place on the day of the week. When the demand response event has been scheduled, processor 214 is programmed to transmit at least one signal representative of the demand response event at the scheduled time.

The term "processor" refers generally to any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term "processor."

In the exemplary embodiment, memory device 218 includes one or more devices that enable information, such as executable instructions and/or other data, to be stored and retrieved. Moreover, in the exemplary embodiment, memory device 218 includes one or more computer readable media, such as, without limitation, dynamic random access memory (DRAM), static random access memory (SRAM), a solid state disk, and/or a hard disk. In the exemplary embodiment, memory device 218 stores, without limitation, application source code, application object code, configuration data, additional input events, application states, assertion statements, validation results, and/or any other type of data. More specifically, in the exemplary embodiment, memory device 218 stores input data received by a user via user interface 204, and/or information received from other components of demand response system 100, such as from user notification device 110 (shown in FIG. 1) and/or data management system 140 (shown in FIG. 1).

Computing device 106, in the exemplary embodiment, also includes a communication interface 230 that is coupled to processor 214 via system bus 220. Moreover, in the exemplary embodiment, communication interface 230 is communicatively coupled to user notification device 110 and data management system 140 via network 112 (shown in FIG. 1). In the exemplary embodiment, communication interface 230 communicates with user notification device 110, data management system 140, and/or other components within system 100.

During operation, when utility 104 needs to initiate and/or implement a demand response program, the user may manually input the initiation and/or implementation of a demand response event to computing device 106 at a particular time. The user may also manually input the names of the customers such that computing device 106 may transmit at least one signal representative of at least one demand response event to the customers that are identified by the user.

Alternatively, computing device 106 may be programmed to select at least one participant from the plurality of customers of utility 104 to participate in at least one demand response event that results in a reduction of energy consumption. More specifically, in the exemplary embodiment, processor 214 transmits a signal via communication interface 230 to data management system 140 to retrieve customer data from database 142. Customer data is transmitted from database 142 to computing device 106, wherein communication interface 230 receives the data and transmits the data to processor 214. Processor 214 selects at least one participant of the customers, based on the customer data, for participating in at least one demand response event. More specifically, in the exemplary embodiment, processor 214 selects the participants by considering the location of each of the customers, such as a geographic location for each customer, a location on network 112 for each customer, and/or a location for a substation, such as substation 120, for each customer. For example, the participants selected may be the customers who have the same geographic location and/or the same substation location, such as substation 120. Processor 214 may also select the participants by considering, for example, the enrollment status for each customer for participating in at least one demand response program. For example, processor 214 may consider the selection made by each customer for at least one demand response program to participate in. Processor 214 may also consider at least one demand response program selected by each customer for each machine 118 to participate in. Processor 214 may also consider the participation history for each customer, such as the previous demand response events each customer has participated in. For example, a customer who has participated in similar demand response events in the past will likely be selected. Alternatively, processor 214 may select the participants by considering any other information about each customer that enables computing device 106 and demand response system 100 to function as described herein.

Processor 214 then verifies that the selected participants satisfy at least one precondition to receive at least one signal representative of the demand response event. In the exemplary embodiment, processor 214 may verify the selected participants by considering any policy limitations that the selected participants may have in any agreements with utility 104. For example, a selected participant may have a policy limitation with utility 104 for participating in only one demand response event per day. If the selected participant has already received a signal for one demand response event for that day, then the selected participant would not receive another signal. Processor 214 may also consider the participation history of each of the selected participants, such as whether the participant participated in similar demand response events in the past. For example, a selected participant who has participated in similar demand response events will likely receive a signal for the instant demand response event as opposed to participants who have never participated in similar demand response events in the past. Processor 214 may also consider the enrollment status for each of the selected participants for participating in at least one demand response program, such as a selection made by each participant for at least one demand response program to participate in and/or at least one demand response program selected by each participant for each machine 118 to participate in.

In the exemplary embodiment, the selected participants and/or the verified participants for the demand response event are presented to the user via display device 210 within presentation interface 207. The user may accept the selected participants and/or the verified participants via user interface 204. Alternatively, the user may make any additional changes via user interface 204.

After the selected participants have each been verified for receiving a signal representative of the demand response event, processor 214 then schedules the demand response event. In the exemplary embodiment, processor 214 schedules a start time for the demand response event to commence on a particular day of the week and schedules the response event for a specific duration of time. For example, processor 214 may schedule the demand response event to start at 10:00 a.m. on Monday and to occur for a period of thirty minutes. When the demand response event has been scheduled, computing device 106 will then transmit at least one signal to each selected participant that is representative of the scheduled demand response event at the scheduled time. The signals may be transmitted to user notification device 110 such that each participant may receive the signal via presentation interface 116. Each participant may then choose whether to participate in the demand response event via user interface 114.

Figure 3:
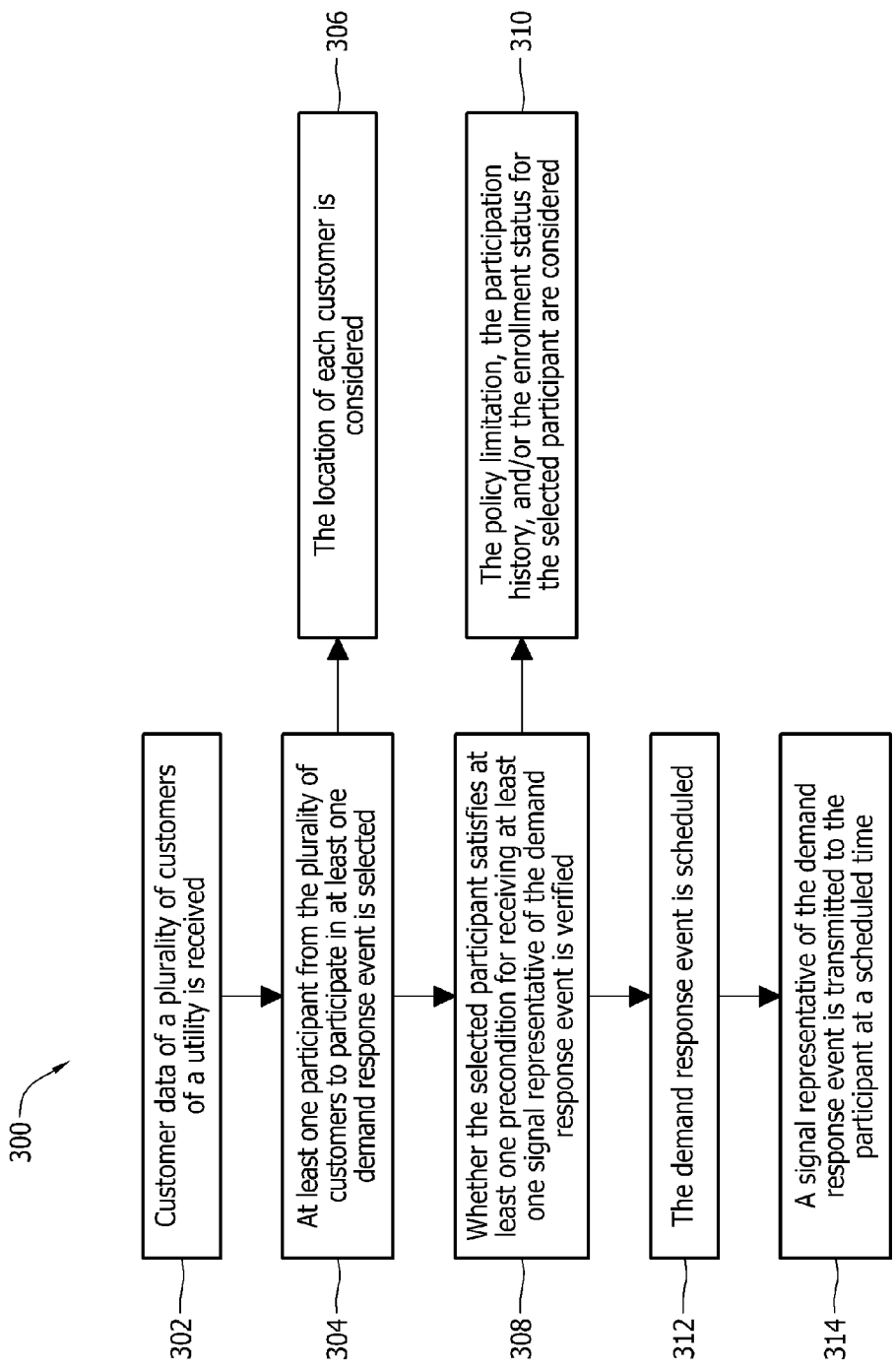
FIG. 3 is a flow chart of an exemplary method that may be used for implementing demand response events using the computing device shown in FIG. 2.

FIG. 3 is a flow chart of a method 300 that may be used for implementing demand response events using a computing device, such as computing device 106 (shown in FIGS. 1 and 2). Customer data of a plurality of customers of a utility 104 (shown in FIG. 1) is received 302, via a communication interface 230 (shown in FIG. 2). The customer data includes at least a location, a policy limitation, a participation history, and an enrollment status for each customer. At least one participant from the plurality of customers to participate in at least one demand response event is selected 304, via a processor 214 (shown in FIG. 2), by considering the customer data. In the exemplary embodiment, when the participant is selected 304, the location of each customer is considered 306.

Whether the selected participant satisfies at least one precondition to receive at least one signal representative of the demand response event is verified 308, via processor 214, by considering the customer data. When the participant is verified 308, the policy limitation, the participation history, and/or the enrollment status for the selected participant are considered 310. The demand response event is then scheduled 312 via processor 214. A signal representative of the demand response event is then transmitted 314 to the participant at a scheduled time.

As compared to known demand response systems that are used to enable utilities to manage energy consumption, the exemplary systems and methods described herein provide a demand response system that enables a utility to effectively implement demand response events. The embodiments described herein include a demand response system that includes a computing device, wherein the computing device includes a communication interface for receiving customer data of a plurality of customers of a utility, wherein the customer data includes at least a location, a policy limitation, a participation history, and an enrollment status for each customer. A processor is coupled to the communication interface and programmed select at least one participant from the plurality of customers, based on the customer data, to participate in at least one demand response event. The processor is further programmed to verify that the selected participant, based on the customer data, satisfies at least one precondition to receive at least one signal representative of the demand response event. By selecting participants of the customers for participating in a demand response event and by verifying whether each participant is appropriate for receiving a signal representative of the demand response event, the burden on every customer may be substantially reduced. By verifying each of the participants, the utility is also enabled to prevent any violations of any agreements and/or policy limitations they have with their customers.

A technical effect of the systems and methods described herein includes at least one of: (a) receiving customer data of a plurality of customers of a utility, wherein the customer data includes at least a location, a policy limitation, a participation history, and an enrollment status for each customer; (b) selecting at least one participant from a plurality of customers to participate in at least one demand response event based on customer data; and (c) verifying, based on customer data, that at least one selected participant satisfies at least one precondition to receive at least one signal representative of at least one demand response event.

Exemplary embodiments of the systems and methods are described above in detail. The systems and methods are not limited to the specific embodiments described herein, but rather, components of the systems and/or steps of the methods may be utilized independently and separately from other components and/or steps described herein. For example, the systems may also be used in combination with other systems and methods, and is not limited to practice with only the systems as described herein. Rather, the exemplary embodiment can be implemented and utilized in connection with many other applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computing device for use with a demand response system, said computing device comprising:
   a communication interface for receiving customer data of a plurality of customers, wherein the customer data includes at least a location, a policy limitation, a participation history, and an enrollment status for each customer;
   a processor coupled to said communication interface and programmed to:
   select at least one participant from the plurality of customers, based on the customer data and a substation location for each customer, to participate in at least one demand response event; and
   verify that the at least one selected participant satisfies at least one precondition to receive at least one signal representative of the at least one demand response event by considering at least the policy limitation, the participation history, and the enrollment status of the at least one selected participant.

2. A computing device in accordance with claim 1, wherein said processor is further programmed to schedule at least one of a start time and a duration of time for the at least one demand response event after the at least one selected participant has been verified.

3. A computing device in accordance with claim 2, wherein said processor is further programmed to transmit the at least one signal to the at least one selected participant at the scheduled start time.

4. A computing device in accordance with claim 1, wherein said communication interface receives updated customer data of the plurality of customers.

5. A computing device in accordance with claim 1, wherein said processor is programmed to select the at least one participant based at least in part on the location of each customer.

6. A computing device in accordance with claim 1, wherein said processor is programmed to select the least one participant based at least in part on at least one of a geographic location for each customer and a location on a network for each customer.

7. A demand response system comprising:
   a data management system comprising a database that includes customer data of a plurality of customers, wherein the customer data includes at least a location, a policy limitation, a participation history, and an enrollment status for each customer;
   a computing device coupled to said data management system, said computing device comprising:
   a communication interface for receiving the customer data;
   a processor coupled to said communication interface and programmed to:
   select at least one participant from the plurality of customers, based on the customer data and a substation location for each customer, to participate in at least one demand response event; and
   verify that the at least one selected participant satisfies at least one precondition to receive at least one signal representative of the at least one demand response event by considering at least the policy limitation, the participation history, and the enrollment status of the at least one selected participant.

8. A demand response system in accordance with claim 7, wherein said processor is further programmed to schedule at least one of a start time and a duration of time for the at least one demand response event after the at least one selected participant has been verified.

9. A demand response system in accordance with claim 8, wherein said processor is further programmed to transmit the at least one signal to the at least one selected participant at the scheduled start time.

10. A demand response system in accordance with claim 7, wherein said communication interface receives updated customer data of the plurality of customers.

11. A demand response system in accordance with claim 7, wherein said processor is programmed to select the at least one participant based at least in part on the location of each customer.

12. A demand response system in accordance with claim 7, wherein said processor is programmed to select the least one participant based at least in part on at least one of a geographic location for each customer and a location on a network for each customer.

13. A method of implementing demand response events, via a computing device coupled to a data management system, the computing device including a processor programmed to perform said method, said method comprising:
   receiving, via the computing device, customer data of a plurality of customers, wherein the customer data includes at least a location, a policy limitation, a participation history, and an enrollment status for each customer;
   selecting, via the computing device, at least one participant from the plurality of customers to participate in at least one demand response event based on the customer data and a substation location for each customer; and
   verifying via the computing device, that the at least one selected participant satisfies at least one precondition to receive at least one signal representative of the at least one demand response event by considering at least the policy limitation, the participation history, and the enrollment status of the at least one selected participant.

14. A method in accordance with claim 13, further comprising scheduling at least one of a start time and a duration of time for the at least one demand response event after the at least one selected participant has been verified.

15. A method in accordance with claim 14, further comprising transmitting the at least one signal to the at least one selected participant at the scheduled time.

16. A method in accordance with claim 13, wherein selecting at least one participant further comprises selecting at least one participant from the plurality of customers to participate in at least one demand response event based at least in part on the location for each customer.

17. A method in accordance with claim 13, wherein selecting at least one participant further comprises selecting at least one participant from the plurality of customers to participate in at least one demand response event based at least in part on at least one of a geographic location for each customer and a location on a network for each customer.

* * * * *